(12) United States Patent
Moyer et al.

(10) Patent No.: US 7,164,240 B2
(45) Date of Patent: Jan. 16, 2007

(54) METHOD AND APPARATUS FOR DRIVING AN EXTERNAL ELECTRODE FLUORESCENT LAMP

(75) Inventors: James C. Moyer, San Jose, CA (US); Timothy J. Rust, Fremont, CA (US)

(73) Assignee: Monolithic Power Systems, Inc., Los Gatos, CA (US)

( * ) Notice: Subject to any disclaimer, the term of this patent is extended or adjusted under 35 U.S.C. 154(b) by 0 days.

(21) Appl. No.: 11/165,783

(22) Filed: Jun. 23, 2005

(65) Prior Publication Data

US 2005/0285548 A1 Dec. 29, 2005

Related U.S. Application Data

(60) Provisional application No. 60/583,215, filed on Jun. 25, 2004.

(51) Int. Cl.
*H05B 41/16* (2006.01)
*H05B 37/02* (2006.01)
*H05B 37/00* (2006.01)

(52) U.S. Cl. .................. 315/255; 315/277; 315/308; 315/324

(58) Field of Classification Search ............ 315/209 R, 315/210–213, 219, 220, 221, 250, 255, 277, 315/279, 291, 307, 308, 312, 324, 311, 299, 315/301
See application file for complete search history.

(56) References Cited

U.S. PATENT DOCUMENTS

| | | | | |
|---|---|---|---|---|
| 5,331,253 | A * | 7/1994 | Counts ................ | 315/209 R |
| 6,534,934 | B1 * | 3/2003 | Lin et al. ............ | 315/312 |
| 6,781,325 | B1 * | 8/2004 | Lee .................... | 315/282 |
| 2004/0246226 | A1 * | 12/2004 | Moon ................. | 345/102 |
| 2005/0017647 | A1 * | 1/2005 | Huang ................ | 315/119 |

* cited by examiner

*Primary Examiner*—Thuy Vinh Tran
(74) *Attorney, Agent, or Firm*—Perkins Coie LLP; Zhou Lu

(57) ABSTRACT

A technique for driving one or more EEFLs, having first and second ends, in a bank of EEFLs involves driving the EEFLs at both the first and second ends. In a non-limiting embodiment a device constructed according to the technique includes a bank of EEFLs connected in parallel. The device further includes a first transformer, wherein a secondary winding of the first transformer is coupled to the first end of the bank of EEFLs. The device further includes a second transformer, wherein a secondary winding of the second transformer is coupled to the second end of the bank of EEFLs.

16 Claims, 5 Drawing Sheets

400

LEFT

RIGHT

L - R

METHOD AND APPARATUS FOR DRIVING AN EXTERNAL ELECTRODE FLUORESCENT LAMP

CROSS-REFERENCE TO RELATED APPLICATIONS

This Application claims the benefit of U.S. Provisional Application No. 60/583,215 filed Jun. 25, 2004, which is incorporated by reference.

BACKGROUND

Fluorescent lamps are used to provide illumination for general lighting purposes, including backlighting for Liquid Crystal Displays (LCDs). The critical factors in the design of a cold-cathode fluorescent lamp (CCFL) include efficiency, cost, and size. A fluorescent lamp is a low-pressure gas discharge source. The lamp contains mercury vapor at low pressure with a small amount of inert gas. The inner wall of the lamp is coated with fluorescent powder. The discharge generates visible radiation. The CCFL has efficiency in the range of 40 to 60 lumens per watt and the average life of the CCFL lasts for 10,000 hours or more.

In a typical lighting application, it may be desirable to monitor input current or other characteristics to maintain consistent brightness. This may include implementing a feedback loop. A CCFL is effectively a constant voltage device. For example, the voltage across a typical CCFL may be about 600–700V rms. If connected in parallel, some CCFLs would hog most of the current, based upon placement and lamp-to-lamp production-variation characteristics. So CCFLs are difficult to mount in parallel and typically require a separate output circuit for each lamp.

Despite this problem, efforts have been made to incorporate multiple CCFLs in single controller topologies. For example, a current balancing scheme for multiple CCFLs is shown in U.S. Pat. No. 6,459,216, which issued Oct. 1, 2002, to Ying Hsien Tsai, entitled "Multiple CCFL current balancing scheme for single controller topologies", which is incorporated by reference.

External Electrode Fluorescent Lamp (EEFL) technology is relatively new. Unlike with CCFLs, which have an electrode on each end of the lamp located inside the tube in direct contact with the plasma, EEFLs have electrodes that are located outside the tube. An EEFL makes contact on the outside of a foil strip, which forms a capacitor between the foil and the plasma. Thus, the electrode at each end does not actually touch plasma inside the tube. This arrangement results in a lamp that does not generate heat and increases lifetime and illumination stability, and decreases power consumption.

Advantageously, EEFLs can easily be configured in a 'parallel' design. EEFLs can be driven in parallel because most of the voltage is across the capacitors, which causes the current to be shared between the lamps. In other words, the capacitors act as a ballast that causes the current to be shared between the lamps. It is therefore possible to run banks of 2, 5, 20, or even more EEFLs from a single suitable inverter. The number of EEFLs in a bank may grow, as well as the size of each EEFL, as the technology improves.

Unfortunately, for an EEFL at 700V rms inside the tube, the voltage outside may be as high as 2000V rms, which means a relatively large amount of voltage is dropped across the capacitors. Thus, there is no "cold end" to the lamp because voltages are too high. This is significant because, for example, feedback circuits used with CCFLs typically rely upon the CCFL including a "cold end," which is run to ground. Thus, prior art feedback circuits have proven difficult to implement with EEFL banks.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for driving one or more EEFLs, having first and second ends, in a bank of EEFLs involves driving the EEFLs at both the first and second ends. In a non-limiting embodiment, a device constructed according to the technique may include a bank of External Electrode Fluorescent Lamps (EEFLs) connected in parallel, wherein the bank of EEFLs has a first end and a second end respectively associated with first ends and second ends of each EEFL in the bank of EEFLs. The device may further include a first transformer, wherein a first of the secondary windings of the first transformer is coupled to the first end of the bank of EEFLs. The device may further include a second transformer, wherein a first of the secondary windings of the secondary transformer is coupled to the second end of the bank of EEFLs. The device may further include a bridge driver, wherein the bridge driver is coupled to the first transformer at the primary windings of the first transformer, and wherein the bridge driver is coupled to the second transformer at the primary windings of the second transformer. In an aspect of the non-limiting embodiment, the first transformer is out of phase with respect to the second transformer, and the first transformer and the second transformer alternately drive the first end and second end, respectively, of the bank of EEFLs.

The first transformer and the second transformer may or may not be coupled to the bridge driver in parallel. The device may or may not further include a PLL for burst mode synchronization.

In another non-limiting embodiment, a device constructed according to the technique may include an External Electrode Fluorescent Lamp (EEFL) having a first end and a second end; a first bridge cap tunable to remove capacitive current from a signal; a first transformer having secondary windings, wherein the secondary windings of the first transformer are operationally connected to the first end of the EEFL and the to the first bridge cap; a second bridge cap tunable to remove capacitive current from a signal; a second transformer having secondary windings, wherein the secondary windings of the secondary transformer are operationally connected to the second end of the EEFL and the to the second bridge cap; and a sense resistor for facilitating feedback of a first signal from the first bridge cap and a second signal from the second bridge cap, wherein the first signal includes a load current associated with the EEFL and the second signal includes a load current associated with the EEFL, wherein, in operation, the first signal has capacitive current associated with the first end of the EEFL removed by the first bridge cap and the second signal has capacitive current associated with the second end of the EEFL removed by the second bridge cap.

The device may or may not further include, wherein the first transformer further includes primary windings and the second transformer further includes primary windings, a voltage source; and a bridge driver operationally connected to the voltage source, the sense resistor, the primary windings of the first transformer, and the primary windings of the second transformer, wherein, in operation, the bridge driver receives current associated with the voltage source and load current associated with the first signal from the first bridge cap and the second signal from the second bridge cap as feedback. The first signal and the second signal may or may not be half wave signals and the feedback may or may not be a full wave signal derived from the first signal and the second signal.

In another non-limiting embodiment, a method according to the technique may include connecting a plurality of External Electrode Fluorescent Lamps (EEFLs) in parallel, wherein the EEFLs each have a first end and a second end; driving the EEFLs from the first ends; driving the EEFLs from the second ends; feeding back current associated with the first ends of the EEFLs; feeding back current associated with the second ends of the EEFLs; bridge compensating the current associated with the first ends of the EEFLs for stray capacitance associated with the first ends; bridge compensating the current associated with the second ends of the EEFLs for stray capacitance associated with the second ends; combining in a feedback signal the bridge compensated current associated with the first ends of the EEFLs and the bridge compensated current associated with the second ends of the EEFLs; and using the feedback signal to regulate power delivered to the EEFLs.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION OF THE INVENTION

It has been found that, since both ends of an EEFL are essentially "hot ends," neither end can be run to ground without an adverse effect on performance that can render the EEFL inoperable. Advantageously, in a non-limiting embodiment, an EEFL is driven in a balanced fashion. Thus, contrary to a typical CCFL configuration in which a "cold end" of the lamp is run to ground, voltage is supplied at both ends of the EEFL. Advantageously, two transformers drive a bank of lamps.

Figure 1:
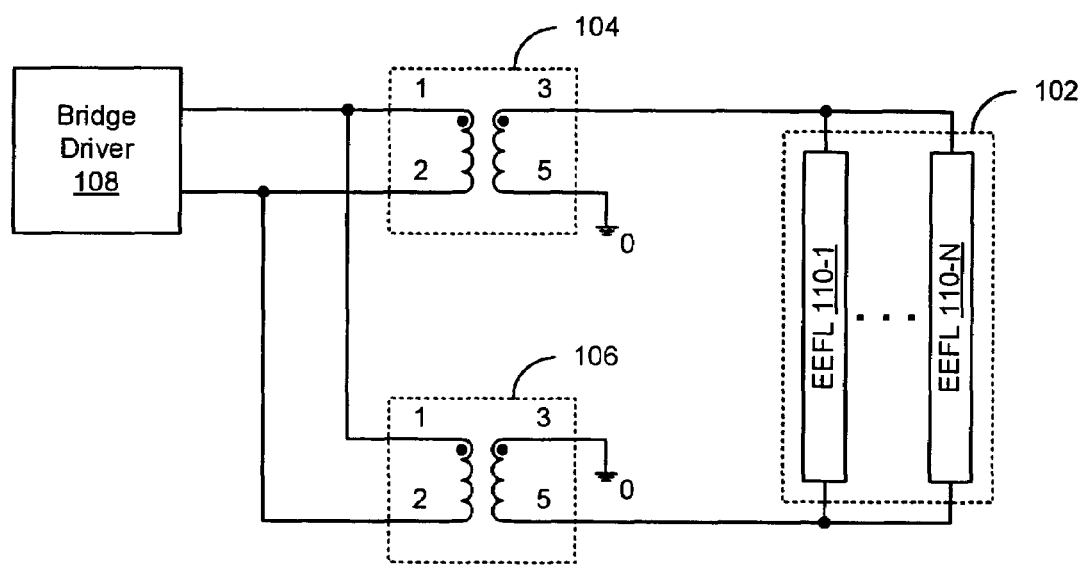
FIG. 1 depicts an example of a circuit in which two transformers drive a bank of EEFLs.

FIG. 1 depicts an example of a circuit 100 in which two transformers drive a bank of EEFLs. The circuit 100 includes a bank of EEFLs 102, a first transformer 104, a second transformer 106, and a bridge driver 108. The bank of EEFLs 102 includes EEFLs 110-1 to 110-N (referred to hereinafter collectively as the EEFLs 110). In a non-limiting embodiment, the EEFLs 110 are coupled between hot ends of the secondary windings of the first transformer 104 and the second transformer 106. In another non-limiting embodiment, to develop the necessary lamp voltage, the primary windings of the first transformer 104 and the second transformer 106 are connected in parallel but out of phase. In an embodiment, the transformers are located right under the bar that drives the EEFLs. It may be noted that optimization may be incorporated in order to reduce sensitivity to stray capacitive coupling to either end of the lamps. An example of this optimization is incorporated into FIG. 3, which is described later.

In the example of FIG. 1, in operation, the bank of EEFLs 102 is driven at a first end by the first transformer 104 and at a second end by the second transformer 106. Advantageously, this prevents current from being drawn off by the stray capacitance at the first end of the bank of EEFLs 102, due to the high voltage swing at the ends of the EEFLs 110, had the second end of the bank of EEFLs 102 been grounded (not shown).

Figure 2:
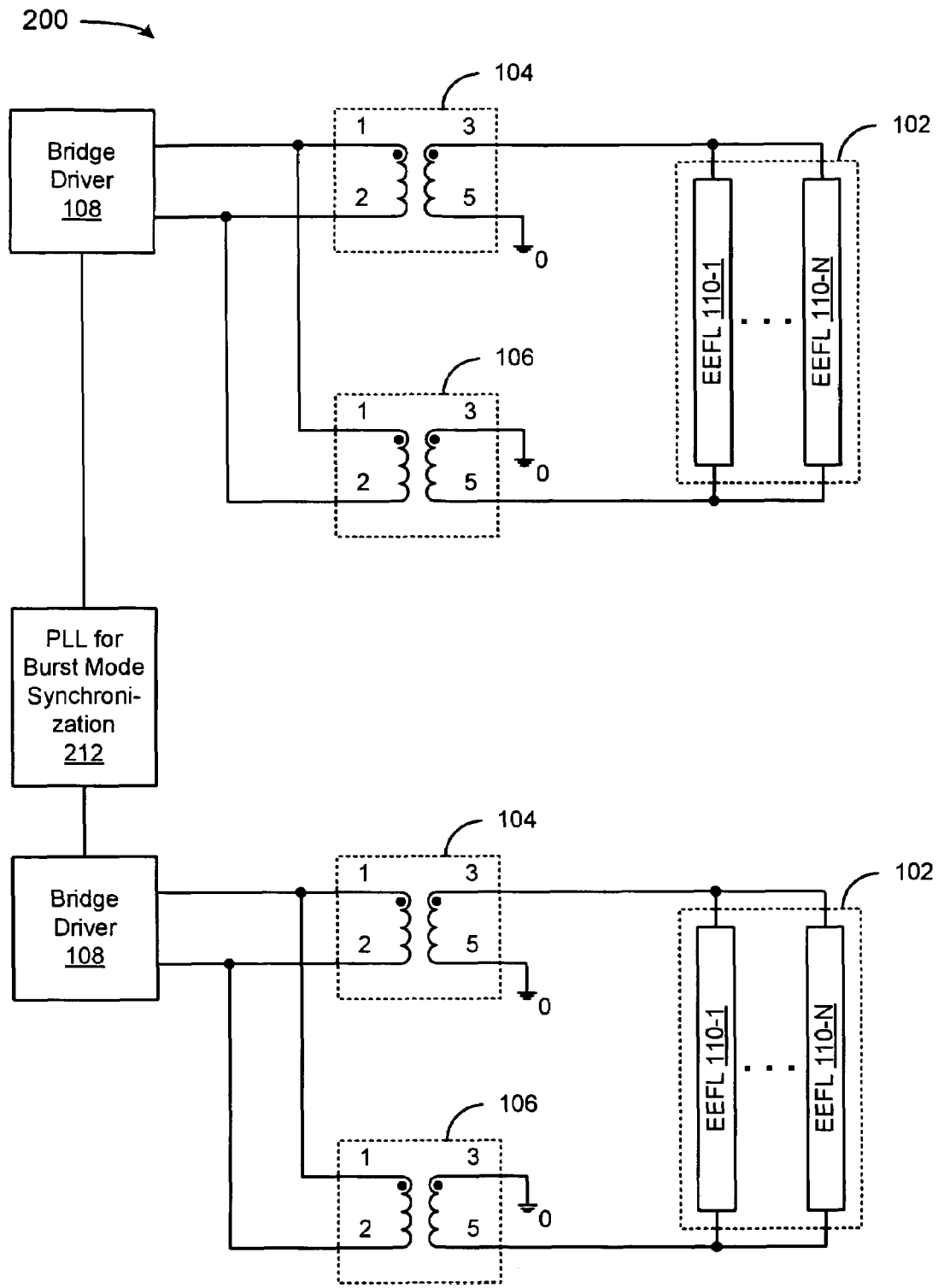
FIG. 2 depicts a system in which circuits similar to those of FIG. 1 are coupled together.

FIG. 2 depicts a system 200 in which circuits similar to those of FIG. 1 are coupled together. The bridge drivers of the circuits are coupled together at a PLL for Burst Mode Synchronization 212. While two circuits are depicted in FIG. 2, any number of circuits could be coupled together in this or some other manner. FIG. 2 is intended to show that the circuits may be coupled together to create, for example, an EEFL inverter for a large panel, but is not intended to be limiting in any way.

Figure 3:
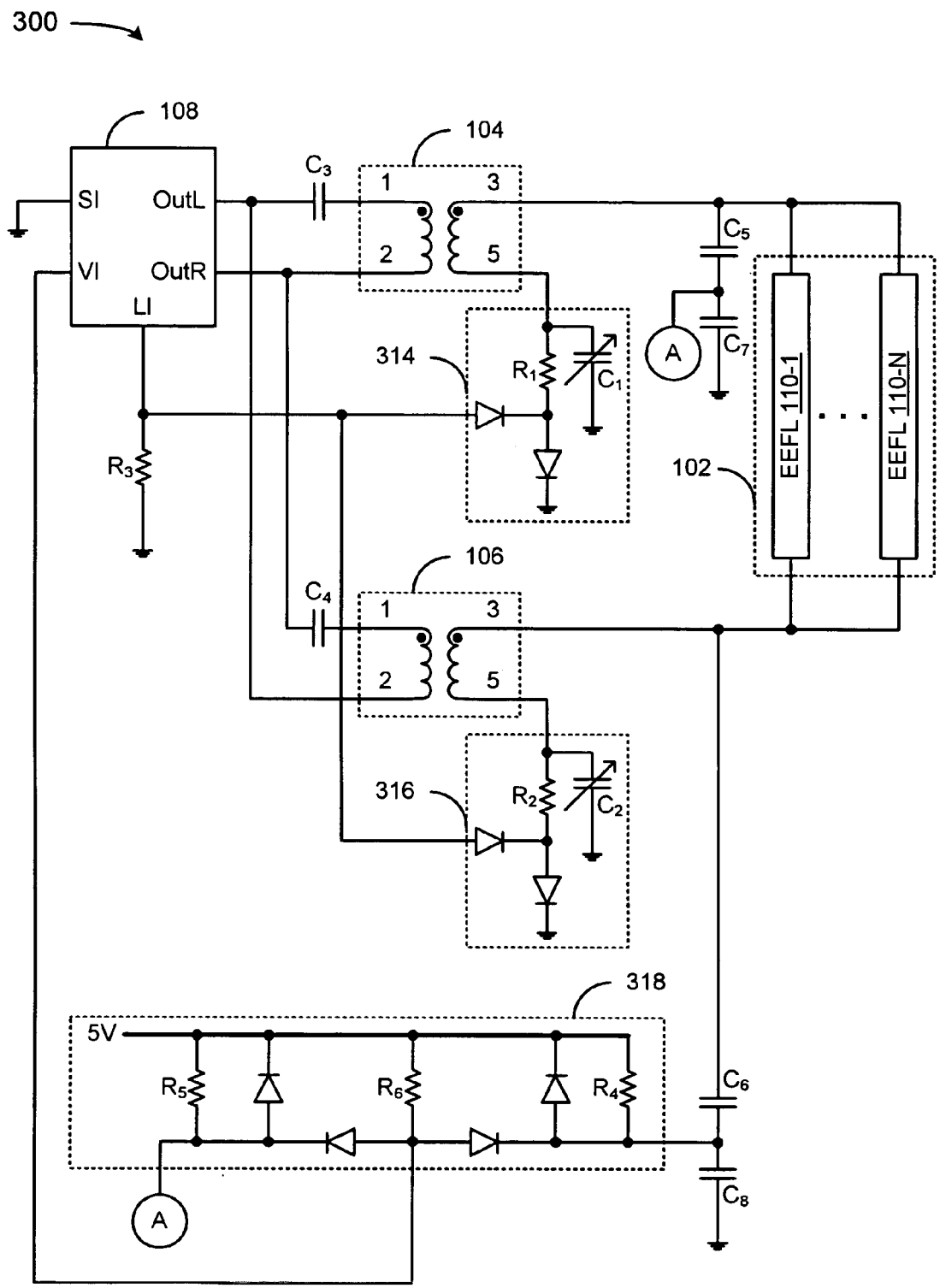
FIG. 3 depicts an example of a circuit in which two transformers drive a bank of EEFLs.

FIG. 3 depicts an example of a circuit 300 in which two transformers drive a bank of EEFLs. Components that are similar to those of FIG. 1 are not described in detail. For the purposes of illustration only, certain components have been grouped into blocks 314, 316, and 318. In the example of FIG. 3, there are eight capacitors labeled $C_1$ to $C_8$ and six resistors labeled $R_1$ to $R_6$. In other examples, more or fewer capacitors and resistors may be employed. The circuit 300 includes a feedback loop to compensate for stray capacitive couplings.

The block 314, which is coupled to the "cold" end of the secondary winding of the transformer 104, includes a capacitor $C_1$ that is tunable based upon the signal passing through the secondary winding of the transformer 104. When properly tuned, the capacitive current (e.g., built-in, stray, and/or other current) in the load is shunted to ground. Since the resistor $R_1$ serves as a ballast for secondary current, the resistor $R_1$ may be referred to as a ballast resistor. It should be appreciated that the capacitor $C_1$, which may be referred to as a bridge cap, adds some phase shift to the lamp current control loop.

In a non-limiting embodiment, the capacitor $C_1$ is tuned during the production of the circuit 300, or a portion thereof. In this way, the circuit 300 need not be reconfigured in the field. In another non-limiting embodiment, even if one or more of the EEFLs 110 are replaced post-production, the tuning is adequate to shunt capacitive current in the load to ground. As used herein, shunting capacitive current to ground means that substantially all of the capacitive current is shunted, or that sufficient capacitive current is shunted so that any capacitive current that is not shunted away has a relatively minor impact on performance.

In an aspect of a non-limiting embodiment, capacitors $C_1$ and $C_2$ are tuned by placing a current transformer in the middle of an EEFL to look at current through the lamp. Set the resistor $R_3$ to scale the desired lamp current. A patched-in capacitor selection box can then be used to tune capacitors $C_1$ and $C_2$ until the lamp currents are the desired value. This effectively subtracts the capacitive current in the transformer secondary, leaving only the lamp currents in sense resistor $R_3$. In this way, the feedback for lamp current can be tuned, though other techniques for tuning capacitors $C_1$ and $C_2$ may be apparent to those of skill in the art of electronics with this reference before them. This tuning may only need to be performed once, though it might have to be redone if the hardware configuration changes.

The output of the block 314, and the corresponding input to the bridge driver 108, represents the lamp current. The bridge driver 108 includes a Lamp Input (LI) for sensing the lamp current. The resistor $R_3$ serves as a sense resistor.

Figure 4:
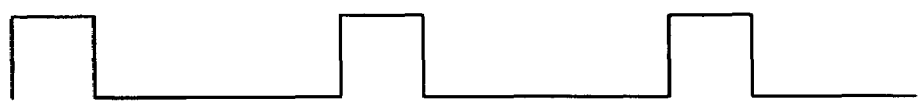
FIG. 4 depicts an example of a full bridge output wave form.
Figure 4:
Figure 4:
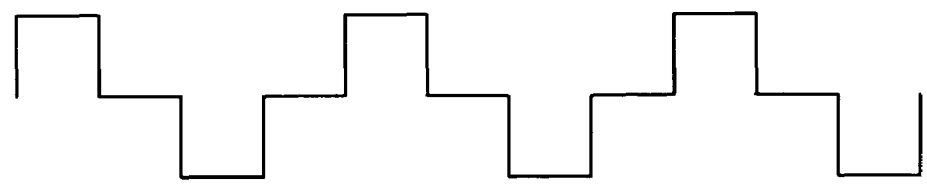

The function of the block 316 is similar to that of the block 314 and includes a tunable capacitor $C_2$ and a resistor $R_2$. The output of the block 316 is to the LI input of the bridge driver 108, with the resistor $R_3$ serving as a sense resistor. Note that the current from blocks 314 and 316 are half-wave signals which are out of phase by one half cycle (180 degrees). When the two currents from blocks 314 and 316 are summed in resistor $R_3$, the result is a full-wave signal representative of the total lamp current, as is illustrated in FIG. 4.

Referring once again to FIG. 3, the signals from OutR and OutL of the bridge driver 108 are received at the primary windings of the transformers 104 and 106. Note that transformer 106 is driven out of phase with respect to transformer 104 (observe the dot convention). In an embodiment, the signals are similar to the RIGHT and LEFT signals illustrated in FIG. 4, resulting in a roughly sinusoidal signal similar to the L-R signal illustrated in FIG. 4. It is important that transformers 104 and 106 be physically located very close to the end of the lamp driven by each, respectively. In a non-limiting embodiment, the signals are carried to the primary winding of the transformers 104, 106 on relatively heavy gauge twisted pair.

As described with reference to FIG. 1, the secondary winding of the transformer 104 drives a first end of the EEFL bank 102 and the secondary winding of the transformer 106 drives a second end of the EEFL bank 102. Referring once again to FIG. 3, with respect to the transformer 104, the "hot" end of the secondary winding is coupled to the capacitor $C_5$ and to the first ends of the EEFLs 110. In a non-limiting embodiment, the run between the capacitor $C_5$ and the EEFLs 110 is very short. The capacitor $C_7$ tends to be large compared to the capacitor $C_5$ (on the order of, by way of example but not limitation, 10 nF, where the capacitor $C_5$ may be only, by way of example but not limitation, 10 pF). An auxiliary control loop is formed by feeding back the voltage-divided signals at the taps of C5/C7 and C6/C8. Block 318, which includes a bias source (in the example of FIG. 3, the voltage source is 5V), combines the two signals from the taps of the capacitive voltage dividers. The resultant voltage signal is fed back to Voltage Input (VI) at the bridge driver 108 which regulates the maximum voltage at the outputs of transformers 104 and 106 in the event of a fault or during striking of the lamps.

It may be noted that since the transformers 104, 106 are driven out of phase, the feedback from the EEFLs 110 will tend toward a full wave in form. In other words, when a first end of the EEFLs 110 are active, the second end will not be active, and vice versa. Thus, the active ends will oscillate in a repeating pattern resulting in feedback that resembles a full wave. Feedback is obtained from both ends and compensated for the capacitive current in the load so that the actual lamp current is sensed, as described previously.

Figure 5:
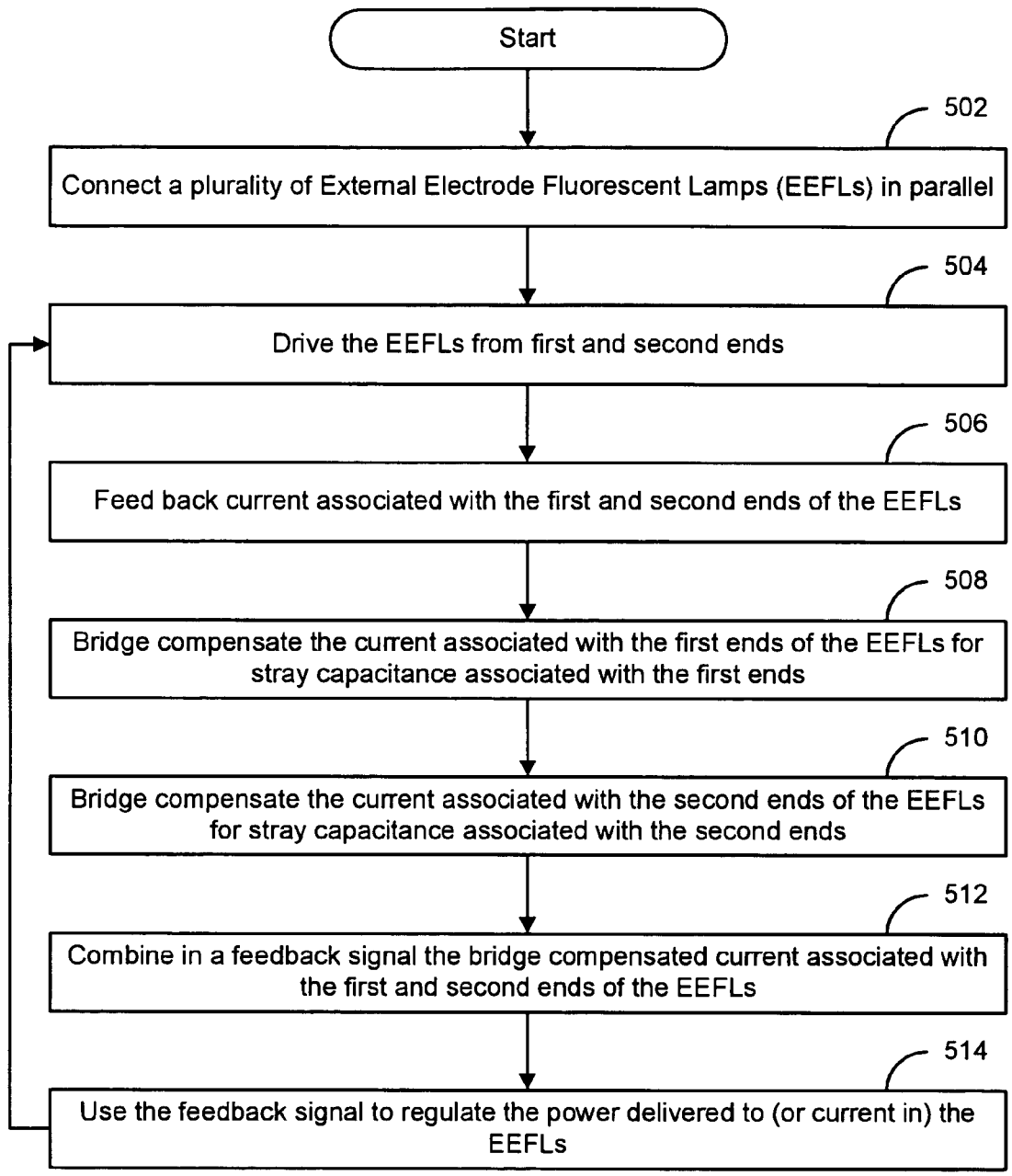
FIG. 5 depicts a flowchart of a method for providing feedback for a plurality of EEFLs connected in parallel.

FIG. 5 depicts a flowchart 500 of a method for providing feedback for a plurality of EEFLs connected in parallel. Claimed methods are depicted as serially arranged modules. However, modules of the methods may be reordered, or arranged for parallel execution as appropriate.

In the example of FIG. 5, the flowchart 500 starts at module 502 at which a plurality of EEFLs are connected in parallel. EEFLs that are connected in parallel are often referred to as a bank of EEFLs. The number of EEFLs in a bank can vary widely and is likely to grow larger as technology improves.

In the example of FIG. 5, the flowchart 500 continues at module 504 at which the EEFLs are driven from first and second ends. Typically, an EEFL has a first end and a second end. Fluorescent tubes are typically driven from one end and the other end is grounded. However, in the example of FIG. 5, the EEFLs are driven at a first end and a second end by, by way of example but not limitation, transformers respectively coupled to the first and second ends. While multiple transformers could be used to drive the first ends of a bank, for illustrative purposes, a bank is considered to have one transformer for each end in embodiments described herein In the example of FIG. 5, the flowchart 500 continues at module 506 at which current associated with the first and second ends of the EEFLs is fed back. The current may include by way of example but not limitation stray capacitive current, built-in capacitance associated with the EEFLs, load current, and/or other current. As would be apparent to one of skill in the art of electronics, capacitance can be introduced at almost any point of a circuit. For example, stray capacitance can be associated with a myriad of points along the length of an EEFL tube. The feedback current may be thought of as associated with a first amalgamated capacitor and a second amalgamated capacitor at respective first and second ends of an EEFL. These amalgamated capacitors are not physical components, but rather theoretical constructs that can be used to estimate total capacitance at the first and second ends of the EEFL. As used herein, the first and second amalgamated capacitors may be referred to as capacitance associated with the first and second ends of the EEFLs. Capacitive current may be similarly associated with the first and second ends of the EEFLs.

In the example of FIG. 5, the flowchart 500 continues at module 508 at which current associated with the first ends of the EEFLs is bridge compensated for stray capacitance associated with the first ends. A bridge cap may be tuned to shunt the stray capacitive current away to ground. In a non-limiting embodiment, the bridge cap would be tuned during the production of the circuit or a portion thereof, and prior to sale. Nevertheless, field-tunable bridge caps or auto-tuning bridge caps could be used. The bridge cap may be tuned to compensate for any desired capacitance, such as built-in capacitance. It may be desirable to compensate for all capacitance, or to compensate for capacitance other than that associated with the load itself In the example of FIG. 5, the flowchart 500 continues at module 510 at which current associated with the second ends of the EEFLs is bridge compensated for stray capacitance associated with the second ends. The module 510 is similar to the module 508.

In the example of FIG. 5, the flowchart 500 continues at module 512 at which the bridge compensated current associated with the first and second ends of the EEFLs is combined in a feedback signal. In a non-limiting embodiment, the feedback signal may be sinusoidal, as described by way of example with reference to FIG. 4. Because of modules 508 and 510, the feedback signal should include the load current of the EEFLs without stray (and/or other) capacitance.

In the example of FIG. 5, the flowchart continues at module 514 at which the feedback signal is used to regulate the power delivered to the EEFLs. Alternatively, the feedback signal may be used to regulate the current in the EEFLs. Since the stray (and/or other) capacitance has been removed, the feedback signal should improve performance. In the example of FIG. 5, the flowchart continues at module 504 as described previously.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A device comprising:
    an External Electrode Fluorescent Lamp (EEFL) having a first end and a second end;
    a first bridge cap tunable to remove capacitive current from a signal;
    a first transformer having a secondary winding, wherein the secondary winding of the first transformer is operationally connected to the first end of the EEFL and to the first bridge cap;
    a second bridge cap tunable to remove capacitive current from a signal;
    a second transformer having a secondary winding, wherein the secondary winding of the second transformer is operationally connected to the second end of the EEFL and the to the second bridge cap;
    a sense resistor for facilitating feedback of a first signal from the first bridge cap and a second signal from the second bridge cap, wherein the first signal includes a load current associated with the EEFL and the second signal includes a load current associated with the EEFL, wherein, in operation, the first signal has capacitive current associated with the first end of the EEFL removed by the first bridge cap and the second signal has capacitive current associated with the second end of the EEFL removed by the second bridge cap.

2. The device of claim 1, wherein the first transformer further includes a primary winding and the second transformer further includes a primary winding, further comprising:
    a voltage source;
    a bridge driver operationally connected to the voltage source, the sense resistor, the primary winding of the first transformer, and the primary winding of the second transformer, wherein, in operation, the bridge driver receives current associated with the voltage source and load current associated with the first signal from the first bridge cap and the second signal from the second bridge cap as feedback.

3. The device of claim 2, wherein the first signal and the second signal are half wave signals and the feedback is a full wave signal derived from the first signal and the second signal.

4. The device of claim 1, further comprising a first ballast resistor operationally connected to the first bridge cap to facilitate tuning of the first bridge cap to remove capacitive current from the load current associated with the EEFL.

5. The device of claim 1, further comprising a second ballast resistor operationally connected to the second bridge cap to facilitate tuning of the second bridge cap to remove capacitive current from the load current associated with the EEFL.

6. The device of claim 1, wherein the load current associated with the EEFL has a roughly sinusoidal shape.

7. The device of claim 1, wherein the first signal and the second signal are full wave signals.

8. The device of claim 1, wherein the first bridge cap shunts the capacitive current to ground.

9. The device of claim 1, further including lead-lag topology to account for phase shift due to the first bridge cap and the second bridge cap.

10. A method, comprising:
    connecting a plurality of External Electrode Fluorescent Lamps EEFLs) in parallel, wherein the EEFLs each have a first end and a second end;
    driving the EEFLs from the first ends;
    driving the EEFLs from the second ends;
    feeding back current associated with the first ends of the EEFLs;
    feeding back current associated with the second ends of the EEFLs;
    bridge compensating the current associated with the first ends of the EEFLs for stray capacitance associated with the first ends;
    bridge compensating the current associated with the second ends of the EEFLs for stray capacitance associated with the second ends;
    combining in a feedback signal the bridge compensated current associated with the first ends of the EEFLs and the bridge compensated current associated with the second ends of the EEFLs;
    using the feedback signal to regulate power delivered to the EEFLs.

11. The method of claim 10, further comprising using a lead-lag topology to account for the bridge compensating the current associated with the first ends of the EEFLs for stray capacitance associated with the first ends.

12. The method of claim 10, wherein each EEFL is one of the plurality in a bank of EEFLs.

13. The method of claim 10, wherein each EEFL is one of the plurality in a bank of EEFLs and wherein said bank of EEFLs and a first transformer are in a single stage.

14. The method of claim 10, wherein the current associated with the first ends of the EEFLs includes load current and capacitive current.

15. The method of claim 10, wherein the bridge compensating the current associated with the first ends of the EEFLs for stray capacitance associated with the first ends includes shunting capacitive current to ground.

16. The method of claim 10, wherein the bridge compensating the current associated with the first ends of the EEFLs for stray capacitance associated with the first ends further includes bridge compensating the current associated with the first ends of the EEFLs for built-in capacitance.

* * * * *